United States Patent
Penna et al.

(10) Patent No.: US 10,650,680 B2
(45) Date of Patent: May 12, 2020

(54) PARKING LOT MAPPING SYSTEM

(71) Applicant: Nissan North America, Inc., Franklin, TN (US)

(72) Inventors: Mauro Della Penna, San Francisco, CA (US); Naoki Kojo, Sunnyvale, CA (US); Daisuke Saito, Sunnyvale, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/119,120

(22) Filed: Aug. 31, 2018

(65) Prior Publication Data

US 2018/0374351 A1 Dec. 27, 2018

Related U.S. Application Data (63) Continuation of application No. 14/736,747, filed on Jun. 11, 2015, now Pat. No. 10,096,248.

(51) Int. Cl.
*G08G 1/14* (2006.01)
*B60W 40/10* (2012.01)
(Continued)

(52) U.S. Cl.
CPC .............. *G08G 1/143* (2013.01); *B60W 40/10* (2013.01); *G01C 21/32* (2013.01);
(Continued)

(58) Field of Classification Search
CPC ......... G08G 1/143; G08G 1/146; G08G 1/092
See application file for complete search history.

(56) References Cited

U.S. PATENT DOCUMENTS 6,640,188 B2   10/2003   Hashida
8,073,617 B2   12/2011   Nakamura
(Continued)

FOREIGN PATENT DOCUMENTS

JP   H09-243391 A   9/1997
JP   2004-009833 A   1/2004
(Continued)

OTHER PUBLICATIONS

International Search Report in PCT/JP2016/062080 dated Jul. 19, 2016.

*Primary Examiner* — Hongmin Fan
(74) *Attorney, Agent, or Firm* — Global IP Counselors, LLP (57) ABSTRACT

A parking lot mapping system includes a server. The server is remote from a plurality of vehicles, and includes a receiver, an electronic controller and a storage device. The receiver is configured to receive data transmitted from the vehicles, the data including a route traveled and a stopping position of each of the vehicles. The electronic controller is configured to determine that each vehicle has entered a parking lot, and form a map of the parking lot including parking lot routes and parking spots based on accumulation of the data including the stopping position of each vehicle and the route traveled by each of the vehicles after determination that each vehicle vehicles has entered the parking lot. The storage device is configured to store the map of the parking lot.

18 Claims, 6 Drawing Sheets

(51) Int. Cl.
*G06K 9/00* (2006.01)
*G08G 1/01* (2006.01)
*G08G 1/0962* (2006.01)
*G08G 1/0967* (2006.01)
*G08G 1/0968* (2006.01)
*H04W 84/00* (2009.01)
*H04W 84/18* (2009.01)
*G01C 21/32* (2006.01)
*G01C 21/36* (2006.01)

(52) U.S. Cl.
CPC ..... *G01C 21/3685* (2013.01); *G06K 9/00791* (2013.01); *G06K 9/00805* (2013.01); *G08G 1/0112* (2013.01); *G08G 1/0129* (2013.01); *G08G 1/0141* (2013.01); *G08G 1/0962* (2013.01); *G08G 1/0967* (2013.01); *G08G 1/096811* (2013.01); *G08G 1/148* (2013.01); *H04W 84/005* (2013.01); *H04W 84/18* (2013.01)

(56) References Cited

U.S. PATENT DOCUMENTS

| | | | |
|---|---|---|---|
| 8,847,791 | B1 | 9/2014 | Urbach |
| 2009/0138497 | A1 | 5/2009 | Zavoli et al. |
| 2009/0153362 | A1* | 6/2009 | Goto ................. G01C 21/32 340/932.2 |
| 2012/0044091 | A1* | 2/2012 | Kim .................... G08G 1/143 340/932.2 |
| 2013/0211699 | A1 | 8/2013 | Scharmann et al. |
| 2014/0040179 | A1 | 2/2014 | Herzog et al. |
| 2015/0123818 | A1* | 5/2015 | Sellschopp ........ G01C 21/3484 340/932.2 |

FOREIGN PATENT DOCUMENTS

| | | | |
|---|---|---|---|
| JP | 3557776 | B2 | 5/2004 |
| JP | 2009-069059 | A | 4/2009 |
| JP | 2009069059 | * | 4/2009 |
| JP | 2014-125196 | A | 7/2014 |
| WO | 2012019628 | A1 | 2/2012 |

\* cited by examiner

PARKING LOT MAPPING SYSTEM

CROSS-REFERENCE TO RELATED APPLICATIONS

This application is a continuation application of U.S. Ser. No. 14/736,747, filed on Jun. 11, 2015, the entire contents of which are hereby incorporated herein by reference in their entirety.

BACKGROUND

Field of the Invention

The present invention generally relates to a parking lot mapping system. More specifically, the present invention relates to a parking lot mapping system that accumulates vehicle position information for mapping parking lots.

Background Information

Vehicle navigation systems rely on map data for vehicle path planning. Map data for many parking lots is incomplete or non-existent. Specifically, data regarding parking lot routes is generally nonexistent, and parking lots can frequently change configurations and routes due to the frequently private nature of their ownership and management. Moreover, parking lots can have a significant amount of travel routes and vehicles access areas.

SUMMARY

It has been discovered that increasing path planning in parking lots is possible by accumulating vehicle position data and information. In view of the state of the known technology, one aspect of the present disclosure is to provide a parking lot mapping system that includes a server. The server is remote from a plurality of vehicles, and includes a receiver, an electronic controller and storage device. The receiver is configured to receive data transmitted from the plurality of vehicles, the data including a route traveled and a stopping position of each vehicle of the plurality of vehicles. The electronic controller is configured to determine that each vehicle of the plurality of vehicles has entered a parking lot, and form a map of the parking lot including parking lot routes and parking spots based on accumulation of the data including the stopping position of each vehicle of the plurality of vehicles and the route traveled by each of the plurality of vehicles after determination that each vehicle of the plurality of vehicles has entered the parking lot. The storage device is configured to store the map of the parking lot.

Another aspect of the present disclosure provides a parking lot mapping method, comprising receiving, via a receiver remote from a plurality of vehicles, data transmitted from the plurality of vehicles, the data including a route traveled and a stopping position of each vehicle of the plurality of vehicles, determining with an electronic controller that each vehicle of the plurality of vehicles has entered a parking lot, and forming a map of the parking lot including parking lot routes and parking spots based on accumulation of the data including the stopping position of each vehicle of the plurality of vehicles and the route traveled by each of the plurality of vehicles after determination that each vehicle of the plurality of vehicles has entered the parking lot, and a storage device configured to store the map of the parking lot.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
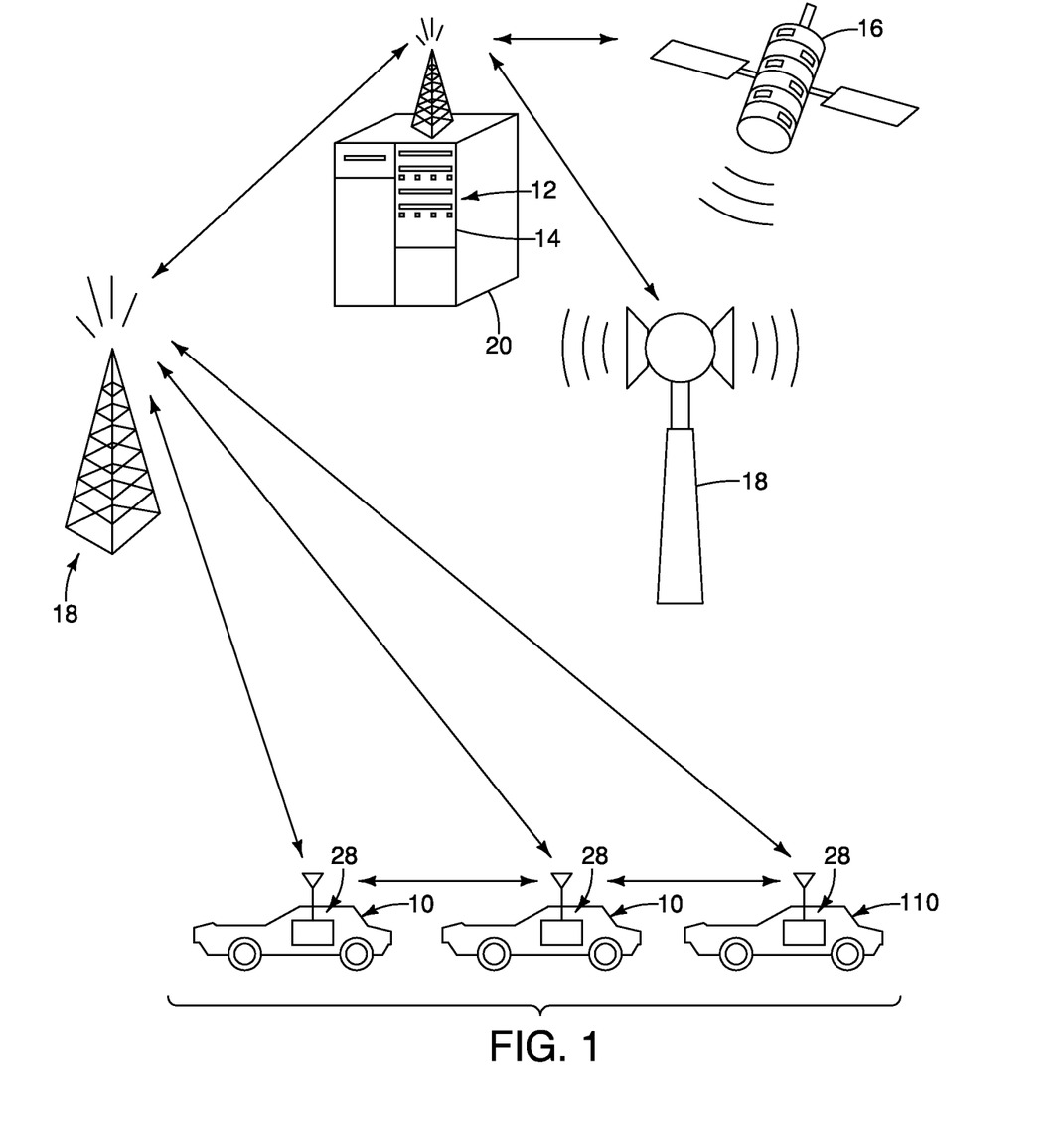
FIG. 1 is a block diagram illustrating an example of a vehicle equipped with a parking lot mapping system according to embodiments disclosed herein in relation to a remote server and components of a wireless communication network.
Figure 7:
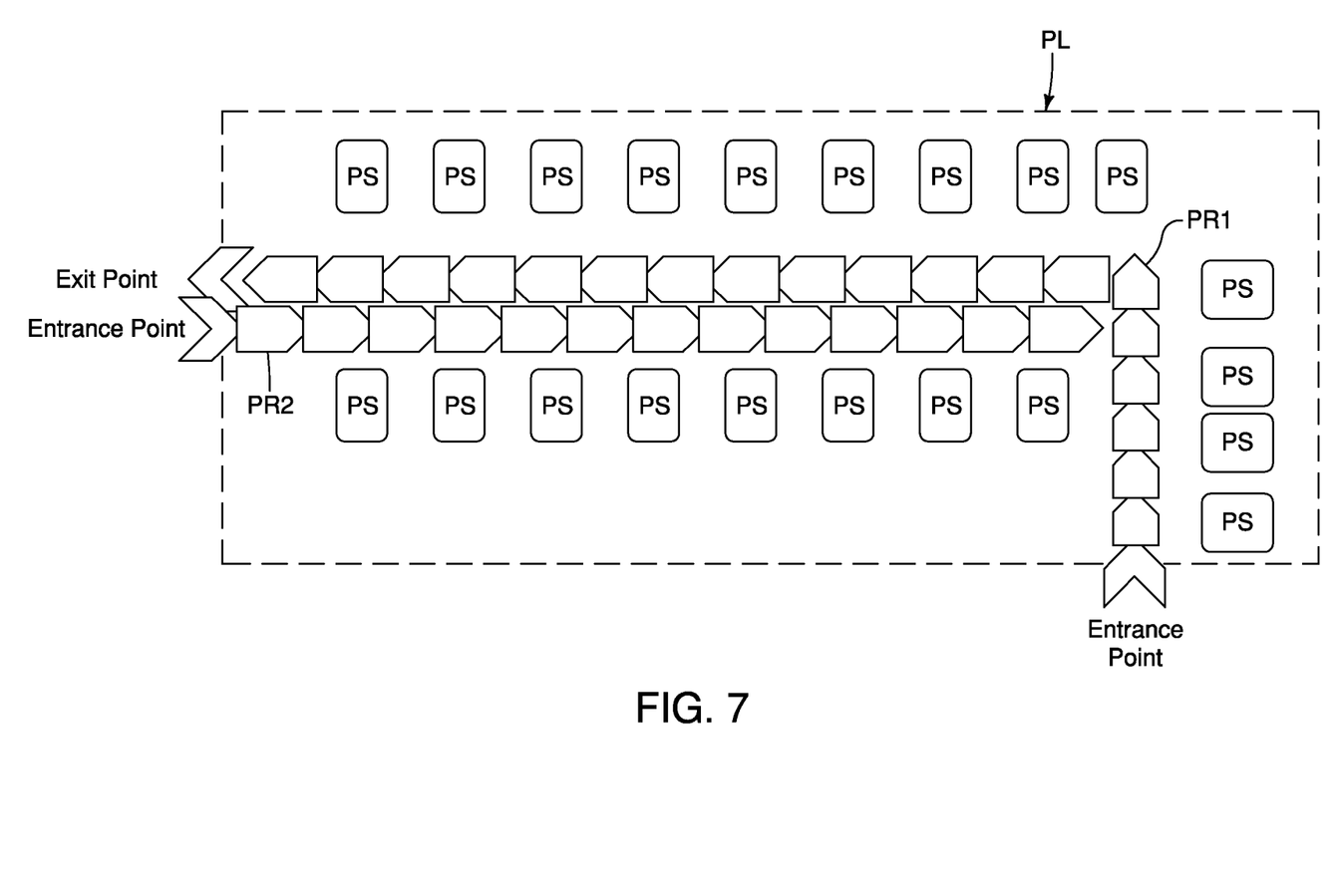
FIG. 7 is a schematic view of a parking lot mapped by the parking lot mapping system according to embodiments disclosed herein.

FIG. 1 illustrates a plurality of vehicles 10 that can communicate with a parking lot mapping system 12 according to a disclosed embodiment that is disposed on a remote server 14. The parking lot mapping system 12 communicates with vehicles 10 and is configured to map a parking lot PL (FIG. 7). That is, the parking lot mapping system 12 maps parking spots PS and parking routes PR1 and PR2, as illustrated in FIG. 7.

The vehicles 10 and the remote server 14 can communicate with a two-way wireless communications network. As seen in FIG. 1, for example, the two-way wireless communications network can include one or more global navigation satellites 16, and one or more terrestrial units, such as roadside (terrestrial) units 18 (two are shown), and a base station or external server 20 that can include the remote server 14. It is noted that the remote server can be located separately from the base station 20, and can be located in any suitable place. The global navigation satellites 16 and the roadside units 18 send and receive signals to and from the vehicle 10 and the remote server 14. The base station 20 sends and receives signals to and from the vehicle 10 and the remote server 14 via a network of the roadside units 18 or any other suitable two-way wireless communications network.

Figure 2:
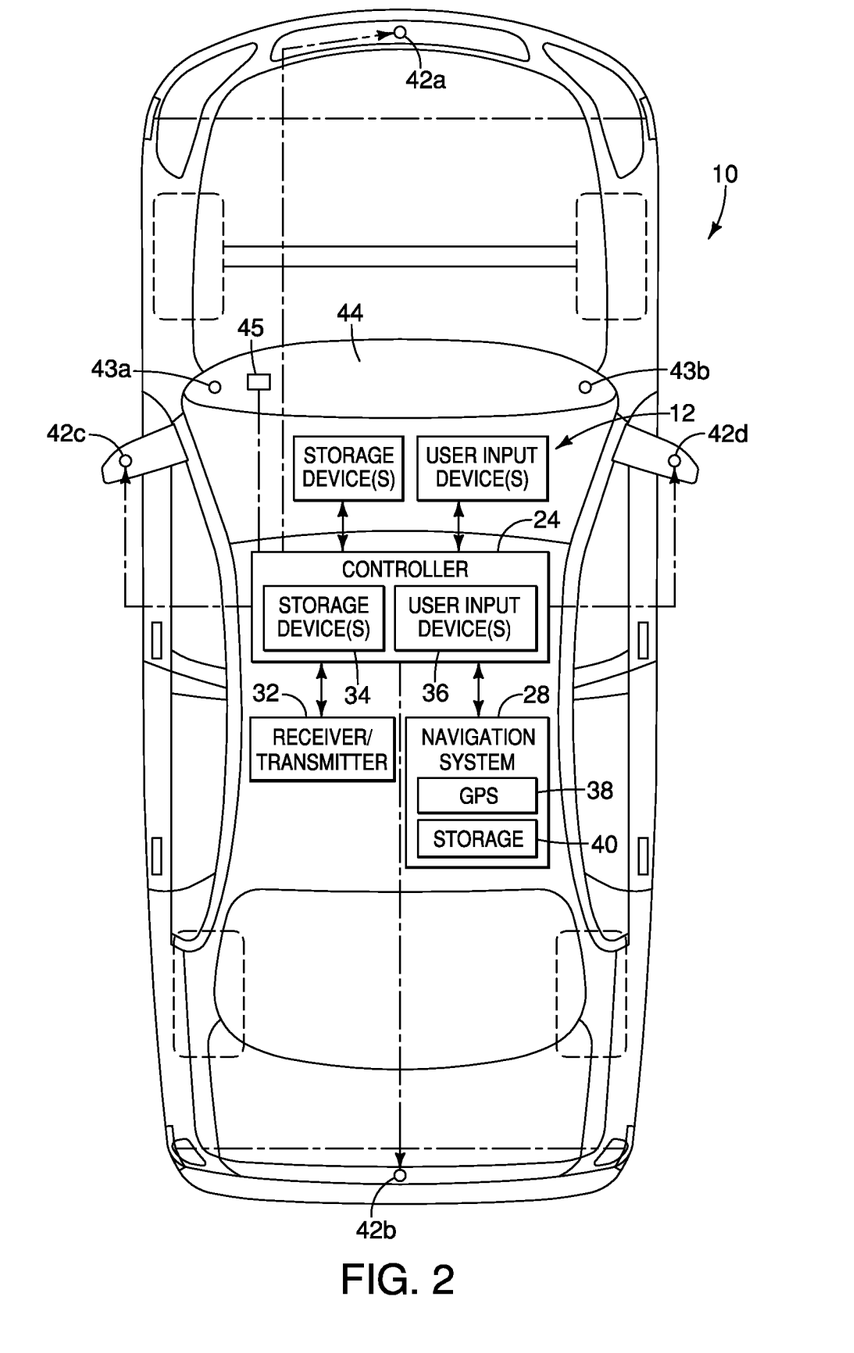
FIG. 2 is a block diagram of an exemplary component of a vehicle equipped with a parking lot mapping system according to embodiments disclosed herein.
Figure 3:
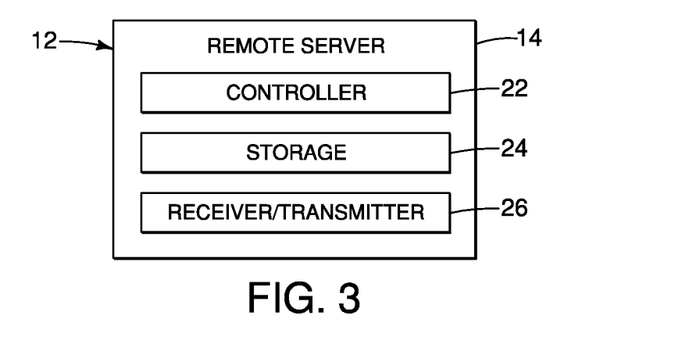
FIG. 3 is a block diagram of exemplary components of a parking lot mapping system according to embodiments disclosed herein.

Referring initially to FIGS. 2 and 3, a parking lot mapping system 12 and the vehicle 10 is illustrated in accordance with one embodiment. Preferably, the parking lot mapping system 12 is disposed entirely at the remote server 14;

however the parking lot mapping system 12 can incorporate aspects of the systems of the vehicle 10. As shown in FIG. 3, the remote server 14 can include a controller 22, a transmitter/receiver 24 and a storage device 26. Additionally, as illustrated in FIG. 2, the vehicle 10 can include a controller 28, a navigation system 30, a display 32, storage device(s) 34 and a receiver/transmitter 36. The remote server 14 can use any of the vehicle components to facilitate the mapping of the parking lot PL. For example, in one embodiment, the controller 28 of the vehicle 10 can be used in addition to or in place of the controller 22 to perform the calculations and make the determinations described herein.

Both controller 22 and controller 28 preferably include a microcomputer with a control program that controls the components of the server 14 or the vehicle 10, as discussed below. The controllers 22 and 28 include other conventional components such as an input interface circuit, an output interface circuit, and storage device(s) such as a ROM (Read Only Memory) device and a RAM (Random Access Memory) device. The microcomputer of the controllers 22 and 28 can be at least programmed to be capable of controlling the parking lot mapping system 12 in accordance, with the flow chart of FIG. 6 discussed below. The microcomputer of the controller 28 is programmed to control one or more of the storage device 34, the navigation system 30, the display 32, and the receiver/transmitter 36, and to make determinations or decisions, as discussed herein. Further, the controller 22 is programmed to control one or more of the storage devices 24 and the transmitter/receiver 26 and to communicate with the systems of the vehicle 10 to control or activate any of the appropriate systems. The memory circuits for the controllers 22 and 28 store processing results and control programs, such as those described herein for the remote server 14 and the vehicle 10. The controllers 22 and 28 are operatively coupled to the systems described herein in a conventional manner, as well as other electrical systems in the vehicle 10 or remote server 14. For example, in the vehicle 10 the controller 28 is operatively coupled to systems, such the turn signals, windshield wipers, lights and any other suitable systems. Such a connection enables the controller 28 to monitor and control any of these systems as desired. The internal RAM of the controllers 22 and 28 stores statuses of operational flags and various control data. The internal ROM of the controllers 22 and 28 stores the information for various operations. The controllers 22 and 28 are capable of selectively controlling any of the components described herein in accordance with the control program. It will be apparent to those skilled in the art from this disclosure that the precise structures and algorithms for the controllers 22 and 28 can be any combination of hardware and software that will carry out the functions of the present invention. Furthermore, the controllers 22 and 28 can communicate with the other components of the parking lot mapping system 12 discussed herein via, for example a controller area network (CAN) bus or in any other suitable manner as understood in the art.

The controller 28 can include or be in communication with user input devices 38. The user input devices 38 can include, (or example, a human-machine interface (HMI) which enables a user (e.g., the driver and/or passenger) to interact with the controller 28, as understood in the art and discussed herein. The controller 28 can further include or be in communication with one or more storage devices 34 which can store information as discussed herein. For example, the storage devices 34 can store parking event data and vehicle position data for transmission to the remote server 14. Such data can be transmitted continuously or substantially continuously or at any desired interval, or can be stored and transmitted at a later time determined by the controller or requested by the remote server 14.

As further shown in FIG. 2, the controller 28 in this example includes or is in communication with a vehicle navigation system 30. The vehicle navigation system 30 includes, for example, a communication device 40, such as a GPS communication device that communicates with the GPS satellites 16. The communication device 38 can also communicate with one or more terrestrial units 18 and a base station 20 or external server to obtain location information. Furthermore, the vehicle navigation system 30 in this example includes or is in communication with a storage device 42 that can store vehicle information, such as previous vehicle route information, location information, or other vehicle information that the GPS is capable of generating, in addition to map data and other location related data as understood in the art. The storage device 42 can be in addition to or work in conjunction with the storage device 34. It is noted that is not necessary to have two storage devices, and storage device 42 and storage device 34 can be the same storage device or combined into one storage device. Moreover, the storage devices 34 and 42 can be disposed in position in the vehicle 10, and not necessarily in the navigation system 30 and the controller 28.

The controller 28 in this example further includes or is in communication with a display 32. The display 32 displays, for example, navigation information which indicates the location of the vehicle 10 with respect to a map as understood in the art. The display 32 can also display warning signals or information related to remote vehicles in the vicinity of the vehicle 10 that may be of interest to the driver of the vehicle 10.

In addition, the vehicle 10 is equipped with a sensors 44a-44d that can generate or capture vehicle environment information. The vehicle environment information can be any information or data related to the vehicle 10, including but not limited to, images of the internal environment, images of the external environment, or information related to characteristics of the vehicle 10 (e.g., vehicle speed, direction, yaw, acceleration, trajectory, heading, vehicle contact warning status, or any other parameter).

The sensors 44a-44d can be equipped with at least one imaging device such as a high-speed camera. In this example, the vehicle 10 includes a front imaging device 44a, a rear imaging device 44b a driver side (or left) imaging device 44c and a passenger side (or right) imaging device 44d. The imaging devices 44a-44d are positioned on the vehicle 10 to capture real time images (or information) to provide 360 degree field of view imaging about the entire exterior perimeter of the vehicle 10. Any vehicle information generated by the imaging devices 44a-44d can be stored in the storage device 34 for future review or inspection, as desired.

Accordingly, as a vehicle 10 enters a parking lot PL the vehicle 10 stores or transmits location data. The vehicle 10 then performs a parking event indicating that the vehicle 10 is in a parking lot PL. A parking lot event can be any one or more of a suitable event that determines that the vehicle 10 is or has been parked. For example, a parking event can be at least one of gear shifting, vehicle stopping for a predetermined time, vehicle starting, vehicle stopping, and a location of the vehicle while parked, or any other suitable event. The parking event and the location information can be transmitted to the remote server 14 via the receiver/transmitter 36 at a suitable time.

As shown in FIG. 3, the remote server 14 includes the controller 22, the storage device 24 and the receiver/transmitter 26. The remote server 14, via the receiver/transmitter 26, receives data transmitted from vehicle 10, the data including a parking event (i.e., the event that determines that a vehicle is or has been parked) and the position of the vehicle 10. The storage device 26 then stores this data.

Thus, in operation, the controller 22 is programmed to determine that each vehicle 10 of a plurality of vehicles is in a parking lot PL based on a parking event and calculates a parking lot route (e.g. PR1 and/or PR2) based on accumulation of the data including the individual positions of a plurality of vehicles 10. As stated above, the parking event is at least one of gear shifting, vehicle stopping for a predetermined time, vehicle starting, vehicle stopping, and a location of the vehicle while parked.

In one embodiment, the parking lot mapping system 12 is capable of obtaining route information for path planning in a parking lot PL. Path planning generally refers to finding a path that allows a vehicle to reach a specific parking spot. That is, the parking lot mapping system 12 determines which route (e.g., PR1 or PR2) on which to travel to park the vehicle 10 in one of the designated parking spots PS. In this embodiment, the parking lot mapping system 12 infers feasible routes to a specific parking spot based on previously driven vehicle information collected from previous vehicles 10 accessing areas of a parking lot. Accordingly, the parking lot mapping system 12 generates maps of the most used public areas of a parking lot PL.

Figure 4:
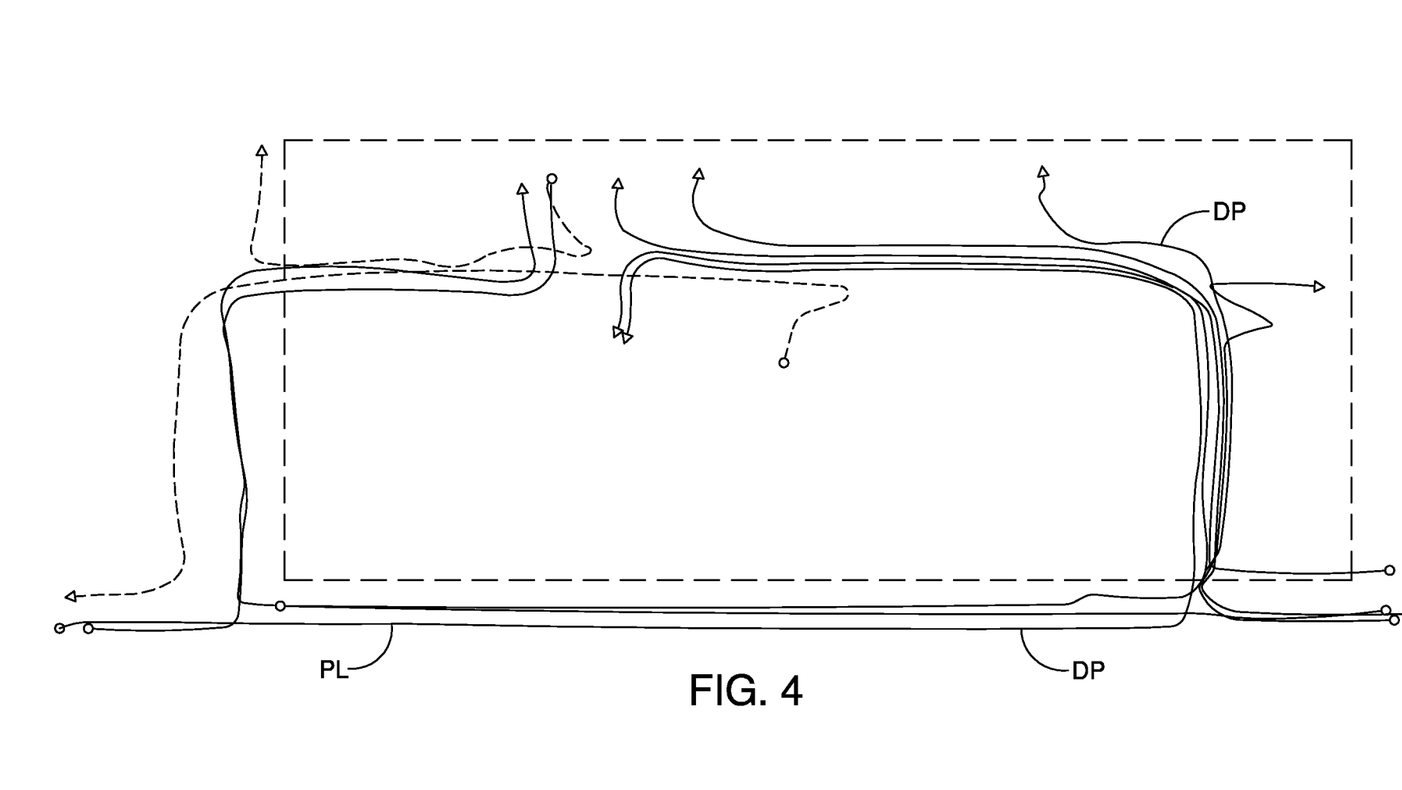
FIG. 4 is a schematic view of a parking lot with vehicle route data.

As shown in FIG. 4, as a vehicle 10 enters a parking lot PL, data is transmitted to the remote server 14. The remote server 14 accumulates the driving paths DP of a plurality of vehicles 10 that enter the parking lot PL. The parking lot data can be the vehicle position as determined by the vehicle navigation system 30 or determined in any other suitable manner (e.g. dead reckoning performed by the controller). That is, the receiver/transmitter 26 is configured to receive navigation (i.e., GPS data) from the vehicle 10. Moreover, based on a parking event, the controller 22 is capable of determining whether the vehicle 10 has entered or exited a parking lot PL. In FIG. 4, the exit pathways are shown in a dotted line, while the entrance pathways or parking pathways are shown in solid line. As stated above, the parking event can be one or more of gear shifting, vehicle stopping, for a predetermined time, vehicle starting, vehicle stopping, and a location of the vehicle while parked, or any other suitable event. For example, the parking event for a vehicle 10 entering a parking lot PL can be gear shifting from drive to park, the vehicle 10 coming to a stop for a significant time, and/or the vehicle 10 being switched off. Additionally, the parking event for a vehicle 10 exiting the parking lot PL can be gear shifting from park to drive or reverse, the vehicle 10 starting moving from a period of inactivity, and/or the vehicle 10 being switched on.

Once a parking event occurs on board the vehicle 10, the controller 28 can preprocess the required data and transmit it to the server 14 via the receiver/transmitter 36. In one embodiment, the relevant data are vehicle position and/or raw GPS data at 1 Hz, and vehicle control inputs, steering angle, pedal position, brake pressure and/or shift position at 10 Hz.

Figure 5:
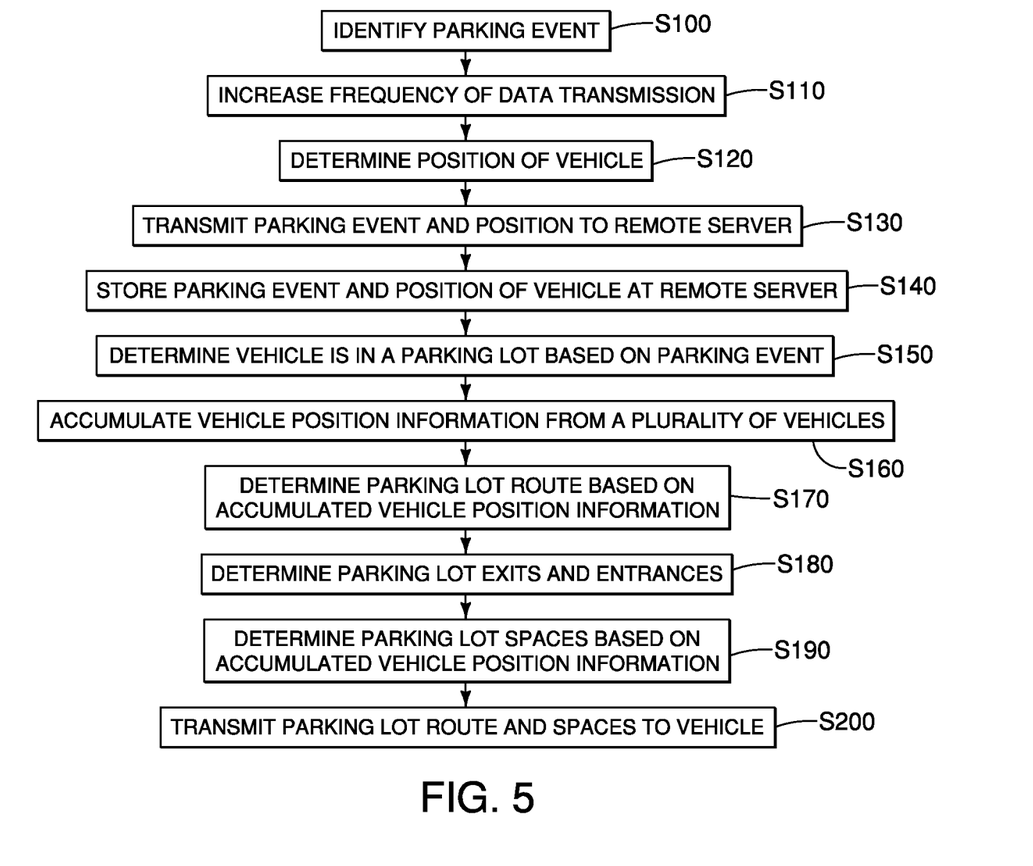
FIG. 5 is a flowchart illustrating an example of operations performed by the parking lot mapping system according to embodiments disclosed herein.

Accordingly, as shown in FIG. 5, the controller 22 first identities a parking event in S100. Alternatively, the driver (i.e., user of the parking lot mapping system) of the vehicle 10 may request parking lot mapping. It is noted that the parking event can be determined by either controller 22 or controller 28. That is, the controller 28 may determine a parking event has occurred, thus determining that the parking event data should be sent to the remote server 14. Alternatively, the vehicle 10 may simply transmit data to the remote server 14, and the controller 22 of the remote server 14 may determine that a parking event has occurred. Once the parking lot event is identified, the controller 28 in the vehicle can increase the frequency at which data is transmitted through the transmitter in S110. Alternatively, the controller 22 may request that the vehicle 10 increase the frequency at which data is transmitted through the transmitter/receiver 36. In other words, the determination to increase the frequency at which data is transmitted can either be made by the controller 28 on board the vehicle 10 or the controller 22 at the remote server 14. The vehicle navigation system 30 (or the controller 28) then determines the position of the vehicle 10 in S120. The parking event or the information that a parking event occurred and the vehicle position is transmitted to the remote server 14, via the transmitted receiver 36 and the transmitter/receiver 26 in S130. Alternatively, once the navigation system data is transmitted to the remote server 14, the controller 22 can determine the vehicle position based on the GPS data.

The remote server 14 stores the parking event and the position of the vehicle 10 in the storage device 24 at the remote server 14 in S140. The controller 22 determines that the vehicle 10 is in a parking lot based on the parking event in S150. The remote server 14 accumulates position information from vehicle 10 as the vehicle 10 moves through the parking lot PL in S160. Moreover, the remote server 14 can accumulate position information from a plurality of vehicles 10 that move through the parking lot PL. The controller 22 can then determine a parking lot route PR1 and/or PR2 based on the accumulated vehicle position information in S170.

Further, the controller 22 can determine the parking lot exits and entrances (FIG. 7) based on vehicle position before or after the parking event in S180. For example, when the parking event is a parking event for a vehicle 10 entering a parking lot, the controller 22 can determine that when the vehicle 10 left a mapped road or other area, the vehicle 10 entered the parking lot PL. In one embodiment, the transmitter/receiver 26 receives data transmitted before the parking event. Conversely, when the parking event is a parking event for a vehicle 10 exiting a parking lot PL, the controller 22 can determine that once the vehicle 10 enters a mapped road or other area, the vehicle 10 has exited the parking lot PL. In one embodiment, the transmitter/receiver 26 receives data transmitted after the parking event. Further, the controller 22 can determine parking lot spaces PS based on the position of a vehicle 10 or the accumulated data of a plurality of vehicles 10 in S190.

In one embodiment, the parking lot PL is determined based on one or more of the parking events. For example, when a vehicle 10 is shifted from drive to park and the vehicle 40 is turned off, the controller 22 determines that the vehicle 10 is positioned within a parking spot PS. The size of the parking spots PS can be calculated or inferred based on the known size of the vehicle 10. Once the controller 22 maps the parking lot PL, the parking lot information can be transmitted back to the vehicle 10 in S200. The parking lot mapping can be continually updated by the data received from the vehicles 10, and the navigation system 30 of one of the vehicles 10 can be continually updated with the most up to date parking lot information.

Figure 6:
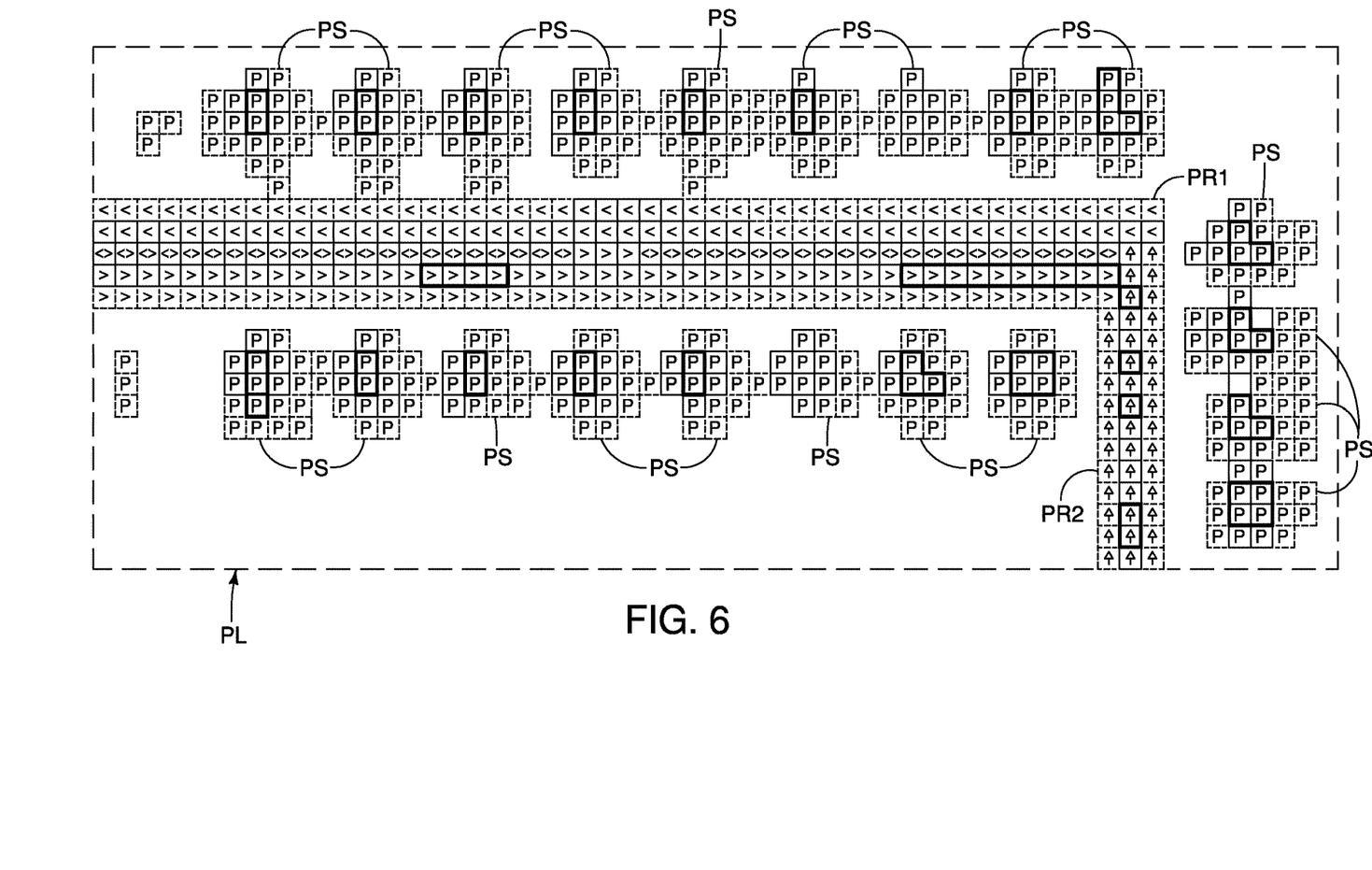
FIG. 6 is a schematic view of a controller of the parking lot mapping system according to embodiments disclosed herein that determines probabilities of parking lot routes and parking areas.

As shown in FIG. 6, in one embodiment, when mapping the parking lot PL, the controller 22 can divide the parking lot area into a grid like structure. Based on the data received from vehicles 10, the controller 22 can analyze each location within the grid with direction vector and parked location, then determine each location with probalistic representation p. In other words, the accumulation of data from the vehicles 10 in the parking lot PL will enable the controller to determine the probability of whether each grid area is a route, a parking spot or an off limits/non-traversable area. Moreover, the accumulation of data from the vehicles 10 in the parking lot PL will enable the controller 22 to determine the direction of each route PR1 and PR2. That is, as a vehicle 10 moves through the parking lot PL and continually transmits location, the controller 22 can determine the direction of routes PR1 and PR2, and whether certain routes are one directional or bi-directional. In one embodiment, the controller 22 is programmed to determine a parking lot route probability and/or a parking spot probability p based on a predetermined quantity of data including the positions of a plurality of vehicles 10 in particular probabilistic spaces over time.

As shown in FIG. 6, the degree of probability can vary. For example, areas that have a high probability of being a parking space PS or have being a route (PR1 or PR2) are shown in bold line. Areas that have a low probability of being a parking space PS or have being a route (PR1 or PR2) are shown in dotted line. Areas that have an average or midlevel probability of being a parking space PS or have being a route (PR1 or PR2) are shown in normal line. Such a probability can be determined based on the frequency data indicates a vehicle 10 is in that area. For example, some vehicles may traverse areas or park in areas that are not designated for such use. Such areas may be designated as low probability. On the other hand, areas that are frequently traversed or in which vehicles are frequently parked would be indicated with a high probability.

Further, the controller 22 can determine the size of the parking spaces PS, the distance the vehicle 10 should travel from the parking spots PS and the distance the vehicle 10 should travel from the routes PR1 and PR2 that have vehicles traveling in the opposite direction.

Once the controller 22 determines the probability of whether each grid area is a route, a parking spot or an "off limits/non-traversable" area, the controller 22 can map the parking lot PL, as shown in FIG. 7. In this embodiment, the parking lot PL is mapped with two entrance points, an exit point and a plurality of parking spots.

It should be understood that the vehicle 10 can also have the sensors 44a-44d, as discussed herein. The present parking lot mapping system 12 can be used in conjunction with such sensors to enable the vehicle 10 to travel through the parking lot PL with or without driver assistance. For example, in one embodiment, the parking lot mapping system 12 transmits the parking lot map to the vehicle 10. The vehicle 10 then can use this information to autonomously move the vehicle 10 through the parking lot PL based on the calculated position of the routes PR1 and PR2 and parking spots PS and the direction of the routes. Moreover, the vehicle 10 may also supplement the mapped parking lot PL, with data obtained through or detected by the sensors 44a-44d to determine the location of obstacles (e.g., remote vehicles, pedestrians or other stationary objects), and stopping areas.

The present invention is not limited to mapping parking lots and may be used to map other areas. For example, it is conceived that the parking lot map system can be used to map personal parking areas and driveways or other non-road locations.

The GPS system and the display device are conventional components that are well known in the art. Since the GPS system and the display device are well known in the art, these structures will not be discussed or illustrated in detail herein. Rather, it will be apparent to those skilled in the art from this disclosure that the components can be any type of structure and/or programming that can be used to carry out the present invention.

Accordingly, the parking lot mapping system 12 described herein maps areas otherwise not mapped in vehicle navigation systems, and updates the configuration of the parking lots in real time to establish an up to date parking lot map. Such a system increases the reliability and efficiency of route referencing and autonomous guidance for vehicle occupants, pedestrians and the general public.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," or "section" when, used in the singular can have the dual meaning of a single part or a plurality of parts. Also as used herein to describe the above embodiments, the following directional terms "rearward", "above", "downward", "vertical", "horizontal", "below" and "transverse" as well as any other similar directional terms refer to those directions of a vehicle equipped with the parking lot mapping system. Accordingly, these terms, as utilized to describe the present invention should be interpreted relative to a vehicle equipped with the parking lot mapping system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "about" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein, without departing front the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A parking lot mapping system, comprising:
a server remote from a plurality of vehicles, the server comprising
a receiver configured to receive data transmitted from the plurality of vehicles, the data including a route traveled and a stopping position of each vehicle of the plurality of vehicles,
an electronic controller configured to determine that each vehicle of the plurality of vehicles has entered a parking lot, and form a map of the parking lot including parking lot routes and parking spots, each of the parking lot routes and each of the parking spots being formed based on accumulation of the data from at least two of the plurality of vehicles, including the stopping position of each vehicle of the plurality of vehicles and the route traveled by each of the plurality of vehicles after determination that each vehicle of the plurality of vehicles has entered the parking lot, and
a storage device configured to store the map of the parking lot.

2. The parking lot mapping system of claim 1, wherein
the electronic controller is configured to determine that each vehicle of the plurality of vehicles has entered a parking lot based on a parking event.

3. The parking lot mapping system of claim 2, wherein
the parking event is at least one of gear shifting, vehicle stopping for a predetermined time, vehicle starting, vehicle stopping, and a location of the vehicle while parked.

4. The parking lot mapping system according to claim 2, wherein
the receiver is configured to receive data transmitted before the parking event.

5. The parking lot mapping system of claim 4, wherein
the electronic controller is configured to determine a parking lot entrance based on the data transmitted before the parking event.

6. The parking lot mapping system according to claim 5, wherein
the electronic controller is configured to determine a parking lot exit based on the data transmitted after the parking event.

7. The parking lot mapping system according to claim 6, wherein
the electronic controller is configured to determine the parking lot routes between the parking lot entrance and the parking lot exit based on the route traveled by each of the plurality of vehicles.

8. The parking lot mapping system according to claim 1, wherein
the electronic controller is configured to determine a direction of the parking lot routes based on the route traveled by each of the plurality of vehicles.

9. The parking lot mapping system according to claim 1, wherein
the electronic controller is configured to determine the location of parking spots based on the stopping position of each vehicle of the plurality of vehicles.

10. A parking lot mapping method, comprising:
receiving, via a receiver remote from a plurality of vehicles, data transmitted from the plurality of vehicles, the data including a route traveled and a stopping position of each vehicle of the plurality of vehicles,
determining with an electronic controller that each vehicle of the plurality of vehicles has entered a parking lot, and forming a map of the parking lot including parking lot routes and parking spots, each of the parking lot routes and each of the parking spots based on accumulation of the data from at least two of the plurality of vehicles, including the stopping position of each vehicle of the plurality of vehicles and the route traveled by each of the plurality of vehicles after determination that each vehicle of the plurality of vehicles has entered the parking lot, and
a storage device configured to store the map of the parking lot.

11. The parking lot mapping method of claim 10, further comprising
determining with the electronic controller that each vehicle of the plurality of vehicles has entered a parking lot based on a parking lot event.

12. The parking lot mapping method of claim 11, wherein
the parking event is at least one of gear shifting, vehicle stopping for a predetermined time, vehicle starting, vehicle stopping, and a location of the vehicle while parked.

13. The parking lot mapping method according to claim 11, wherein
the receiving data transmitted from the plurality of vehicles includes receiving data transmitted before the parking event.

14. The parking lot mapping method of claim 13, wherein
the receiving data transmitted from the plurality of vehicles includes receiving data transmitted before the parking event.

15. The parking lot mapping method according to claim 14, further comprising
determining with the electronic controller a parking lot exit based on the data transmitted after the parking event.

16. The parking lot mapping method according to claim 15, further comprising
determining with the electronic controller the parking lot routes between the parking lot entrance and the parking lot exit based on the route traveled by each of the plurality of vehicles.

17. The parking lot mapping method according to claim 10, further comprising
determining with the electronic controller a direction of the parking lot routes based on the route traveled by each of the plurality of vehicles.

18. The parking lot mapping method according to claim 10, further comprising
determining with the electronic controller the location of parking spots based on the stopping position of each vehicle of the plurality of vehicles.

* * * * *